C. O. ANDERSON.
FRICTION PULLEY.
APPLICATION FILED FEB. 15, 1916.

1,181,053.  Patented Apr. 25, 1916.

UNITED STATES PATENT OFFICE.

CARL OSCAR ANDERSON, OF LANCASTER, PENNSYLVANIA, ASSIGNOR TO CHAMPION BLOWER & FORGE COMPANY, OF LANCASTER, PENNSYLVANIA, A CORPORATION OF PENNSYLVANIA.

FRICTION-PULLEY.

1,181,053.

Specification of Letters Patent.

Patented Apr. 25, 1916.

Application filed February 15, 1916. Serial No. 78,441.

*To all whom it may concern:*

Be it known that I, CARL OSCAR ANDERSON, a citizen of the United States, residing at Lancaster, in the county of Lancaster, and State of Pennsylvania, have invented certain new and useful Improvements in Friction-Pulleys; and I do hereby declare the following to be a full, clear, and exact description of the invention, such as will enable others skilled in the art to which it appertains to make and use the same.

This invention relates to pulleys, and more particularly to pulleys of the type in which rotation of the driven member is effected by frictional contact between co-acting elements of the driving and the driven member, which latter member may be either the pulley itself or the shaft with which it connects, according to different requirements in practical use or the work to be performed.

The objects of the invention are to provide a friction pulley of the character referred to which shall be simple in construction, inexpensive in manufacture and efficient and reliable in practical use, and further to provide simple and efficient means for effecting the desired frictional engagement between co-acting elements of the driving and the driven member with provision for varying the pressure contact between the contacting surfaces so as to effect a locking or working engagement of such surfaces with different degrees of pressure, according to the weight or load to be carried, as may be desirable under different conditions and requirements in practical use, in lifting or carrying light and heavy weights or loads.

The invention will first be hereinafter more particularly described, with reference to the accompanying drawings, which are to be taken as a part of this specification, and then pointed out in the claims at the end of the description.

Figure 4:
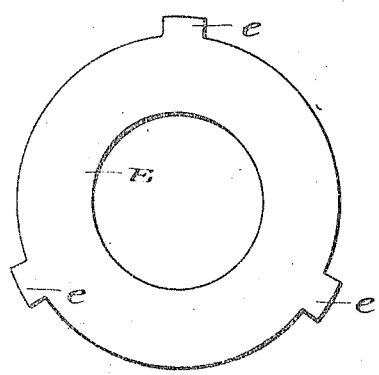
Figure 5:
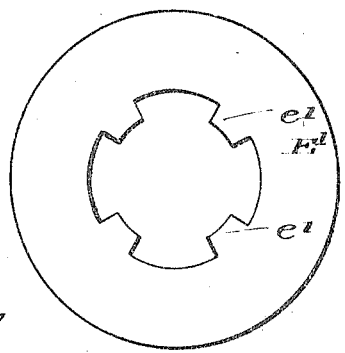
Figure 1:
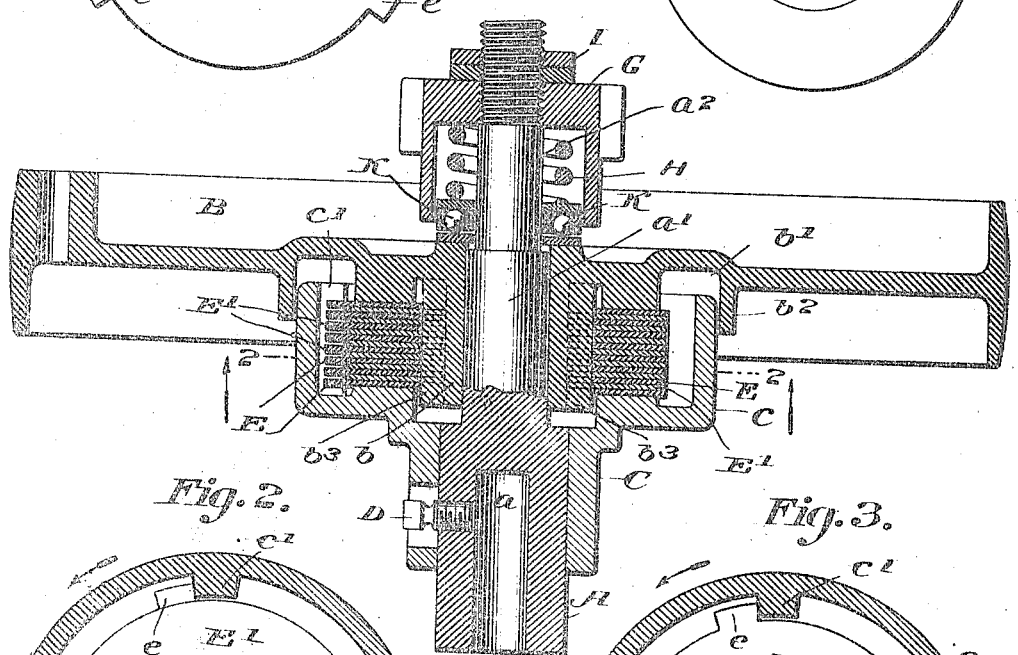
Figure 2:
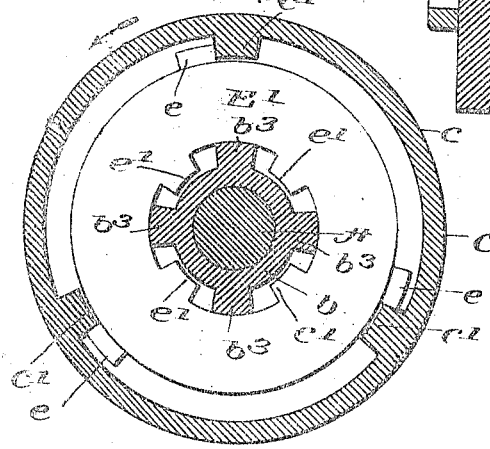
Figure 3:
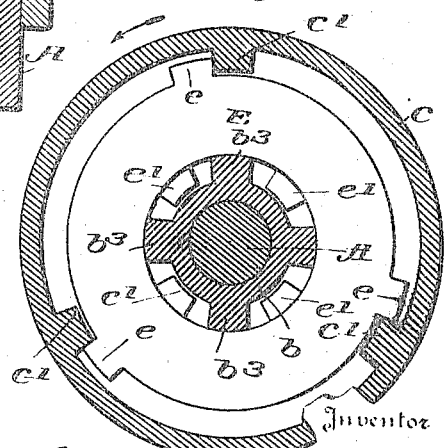

In said drawings, Figure 1 is a vertical sectional elevation of a pulley embodying my invention, showing the pulley mounted on a vertically disposed stub-shaft; Fig. 2 is a transverse section taken on the line 2—2 of Fig. 1, looking in the direction of the arrows; Fig. 3 is a transverse section taken on said line 2—2 of Fig. 1, looking in the opposite direction from that shown in Fig. 2; Fig. 4 is a top plan view of the friction disk or plate which is exposed to view in Fig. 2, showing the same detached; and Fig. 5 is a top plan view of the friction disk or plate which is exposed to view in Fig. 3, showing the same detached.

Referring to said drawings, in which the same reference letters are used to denote corresponding parts in different views, the letter A may denote a driving or driven shaft, in this instance a stub-shaft having a socket $a$ in the lower end thereof to receive the end of another shaft on which it may be mounted, or to which it may be secured, for imparting motion thereto, or to receive motion therefrom. The letter B may denote a disk or wheel forming one member of the pulley, which will be referred to as the driven member, though it is obvious that either the pulley or the shaft may be the driving or the driven member, according to different requirements or the desires of the user. The pulley preferably consists of the disk member or wheel B having a hub $b$ which is loose on the axle A, and a chambered sleeve C, into which the hub $b$ projects, and which is fixed on the axle or shaft A and held in fixed relation thereto by means of a set screw D or any other suitable means. The sleeve C is provided with a web portion having a peripheral portion or rim $c$, which projects into an annular recess $b^1$ in the confronting web of the wheel B, and is provided on the inner side thereof with a plurality of inwardly projecting ribs or cogs $c^1$, preferably three in number, as shown, for a purpose hereinafter stated. The hub of the wheel B is slidably and rotatively fitted on a preferably reduced portion or extension $a^1$ of the shaft A, and provided on its web portion with a circumferential flange $b^2$, which overlaps the flange $c$ on the sleeve C, to form a dust guard that will prevent dirt and dust from entering the chambered portion surrounding the hub of the wheel. The wheel hub $b$ is also provided with a plurality of radial ribs or cogs $b^3$ and has loosely fitted thereon a series of friction plates or disks E, which are provided with a plurality of cogs or projections $e$, adapted to engage the ribs $c^1$ on the rim of the sleeve C while free to rotate in either forward or backward direction on the hub $b$ and also having a limited rotary movement independently of the sleeve C between the ribs $c^1$. Another series of friction plates or disks $E^1$ are fitted on the hub of the wheel B preferably alternating with the disks E, and provided with cogs or projections $e^1$, adapted to contact with the cogs or projections $b^3$ on the hub $b$ so that said disks or plates may be caused to rotate with the hub, while free to rotate independently of the chambered sleeve C, a slight movement thereof in either forward or backward direction independently of the hub being permitted by the distance between the cogs $b^3$ between which the cogs $e^1$ are placed. The disks E and $E^1$ are preferably composed of fibrous material, though any other suitable material may be used. By the described arrangement, when the two members of the pulley are connected by frictional engagement of the friction plates or disks sufficient to cause the wheel to rotate with the sleeve, the latter being normally free to rotate independently of the wheel and of the series of friction disks or plates $E^1$, except by pressure-contact of the adjacent surfaces of the friction disks or plates E with the friction disks or plates $E^1$, and assuming that the shaft A is being driven and with it the chambered sleeve C, in the direction indicated by the arrows in Figs. 2 and 3, the cogs or projections on the inner side of the rim of the sleeve will engage the cogs or projections $e$ on the peripheries of the friction plates and cause the latter to rotate with the sleeve, and thereby impart rotary movement to the wheel or pulley proper B, while permitting independent rotary movement of either the sleeve or the wheel, if the load or weight to be carried is sufficient to overcome the frictional resistance between the friction plates or disks. For the purpose of holding the series of friction plates or disks in frictional contact with greater or less binding force, and thereby causing the wheel or pulley proper to rotate with the chambered sleeve, or vice versa, with provision for varying the pressure-contact as may be desired under different conditions or requirements in practical use, the shaft A may be provided with a reduced extension $a^2$, on which may be screwed a cap G containing a coiled or other suitable spring H adapted to force the friction plates carried by the wheel B and chambered sleeve C into binding contact with each other. The exteriorly threaded end of the shaft A is also provided with lock nuts I, for locking and holding the cap G in a fixed position. The nut or cap G is adjustable on the threaded extremity of the shaft A so as to permit variation of the tension exerted by the spring H upon the friction disks by turning said cap or nut one way or the other, and adjusting the lock nuts so as to hold the cap in adjusted position. To prevent undue friction between the end of the spring and the hub of the wheel B, against which or a friction disk or washer thereon the spring abuts, I preferably interpose an end thrust ball bearing K which is of a type well known in the ball bearing art, and which will reduce friction at this point to a minimum.

The utility and advantages of my invention are obvious. The described construction provides a simple and efficient pulley which will reliably and automatically engage or be engaged by the shaft upon which it is mounted when the friction between the friction plates is of sufficient binding force and yet may yield when this force is overcome, to prevent shocks and strains due to sudden stopping or starting of the mechanism, and reducing the liability to breakage to a minimum; and the pressure-contact between the friction plates may be varied and adjusted with a nicety and precision to cause the pulley to rotate with different degrees of pressure under varying weights or loads in a manner not possible with friction pulleys as heretofore ordinarily constructed.

Having thus described my invention, what I claim as new and desire to secure by Letters Patent of the United States is:

1. A pulley comprising two rotary members, one relatively fixed and the other loose and slidably mounted on a shaft or arbor carrying the fixed member, a series of friction plates or disks revolubly mounted on said shaft between the hub portions of said members, some of said plates being adapted to revolve independently of the others, means on one of said members adapted to engage and cause a number of said plates to rotate therewith, and means on the other member for engaging and causing the other plates to rotate therewith, whereby the two members may be locked in frictional engagement and caused to rotate together.

2. A pulley comprising two rotary members, one relatively fixed and the other loose and slidably mounted on a shaft or arbor carrying the fixed member, two sets of friction plates or disks revolubly mounted on said shaft between the hub portions of said members, each set of said plates being adapted to revolve independently of the other set, inter-engaging means whereby one of said members and one set of said plates are caused to rotate together, and other inter-engaging means whereby the other member and the other set of plates are caused to rotate together.

3. A pulley comprising two rotary members, one relatively fixed and the other loose and slidably mounted on a shaft or arbor carrying the fixed member, two sets of friction plates or disks revolubly mounted on said shaft between the hub portions of said members, each set of said plates being adapted to revolve independently of the other set, inter-engaging means whereby one of said members and one set of said plates are caused to rotate together, and other inter-engaging means whereby the other member and the other set of plates are caused to rotate together, each set of plates having a limited rotary movement in either forward or backward direction independently of the member having means thereon for engagement therewith.

4. A pulley comprising two rotary members, one relatively fixed and the other loose and slidably mounted on a shaft or arbor carrying the fixed member, two sets of friction plates or disks revolubly mounted on said shaft between the hub portions of said members, each set of said plates being adapted to revolve independently of the other set, inter-engaging means whereby one of said members and one set of plates are caused to rotate in unison, and other inter-engaging means whereby the other member and the other set of plates are caused to rotate in unison, together with means on said shaft for forcing the two sets of plates into frictional engagement with each other.

5. A pulley comprising two rotary members, one relatively fixed and the other loose and slidably mounted on a shaft or arbor carrying the fixed member, two sets of friction plates or disks revolubly mounted on said shaft between the hub portions of said members, each set of said plates being adapted to revolve independently of the other set, inter-engaging means whereby one of said members and one set of said plates are caused to rotate in unison, and other inter-engaging means whereby the other member and the other set of plates are caused to rotate in unison, together with a spring on said shaft for forcing said plates into frictional engagement with each other.

6. A pulley comprising two rotary members, one relatively fixed and the other loose and slidably mounted on a shaft or arbor carrying the fixed member, two sets of friction plates or disks revolubly mounted on said shaft between the hub portions of said members, each set of said plates being adapted to revolve independently of the other set, inter-engaging means whereby one of said members and one set of said plates are caused to rotate in unison, and other inter-engaging means whereby the other member and the other set of plates are caused to rotate in unison, together with a spring on said shaft for forcing said plates into frictional engagement with each other; and means for adjusting and varying the tension of the spring.

7. A friction pulley comprising a shaft or arbor, a chambered member fixed on said shaft, a wheel having a web portion provided with an annular recess and a hub which projects into said chambered member, the latter having a peripheral flange which projects into said annular recess in the web of said wheel, a double series of friction plates or disks fitted on said shaft within said chambered member between the hub portion thereof and the hub portion of said wheel; said wheel having means thereon adapted to engage one series of said plates so as to cause them to rotate therewith, and said chambered member having means thereon adapted to engage another series of said plates and cause them to rotate therewith, each series of plates having a limited rotary movement independently of the member with which they are adapted to be engaged, and means for holding one series of said plates in frictional engagement with the other.

8. A friction pulley comprising a shaft or arbor, a chambered sleeve fixed on said shaft, a wheel having a web portion provided with an annular recess and a hub loosely and slidably fitted on said shaft; said hub projecting into said chambered member, the latter having a peripheral flange or rim which projects into said annular recess in the web of said wheel, a double series of friction plates or disks fitted on said shaft within said chambered member between the hub portion thereof and the hub portion of said wheel; said wheel having means thereon adapted to engage one series of said plates so as to cause them to rotate therewith, and said chambered member having means thereon adapted to engage another series of said plates and cause them to rotate therewith, each series of plates adapted to rotate independently of the other series and having a limited rotary movement independently of the member with which it is engaged, and means for holding said double series of plates in frictional engagement with each other; said means consisting of a cap screwed on said shaft, a spring within said cap arranged to exert a yielding pressure on said wheel and thereby force the friction plates into frictional engagement, and means for adjusting and locking said cap in adjusted position.

9. A pulley comprising two rotary members, one relatively fixed and the other loose on a shaft or arbor carrying the fixed member, two series of friction plates or disks revolubly mounted on said shaft between the hub portions of said members, the plates of one series alternating with those of the other series and each series being adapted to revolve independently of the other series, inter-engaging means whereby one of said members and one series of said plates are caused to rotate together, and other inter-engaging means whereby the other member and the other series of said plates are caused to rotate together, each of said plates having a limited rotary movement in either forward or backward direction independently of the member having means thereon for engagement therewith.

In testimony whereof I affix my signature in the presence of two witnesses.

CARL OSCAR ANDERSON.

Witnesses:
CHAS. E. LONG,
ELIZABETH H. MUSSER.